Dec. 7, 1926. 1,609,582
J. A. SNIDER
LUBRICATING DEVICE
Filed Oct. 19, 1923
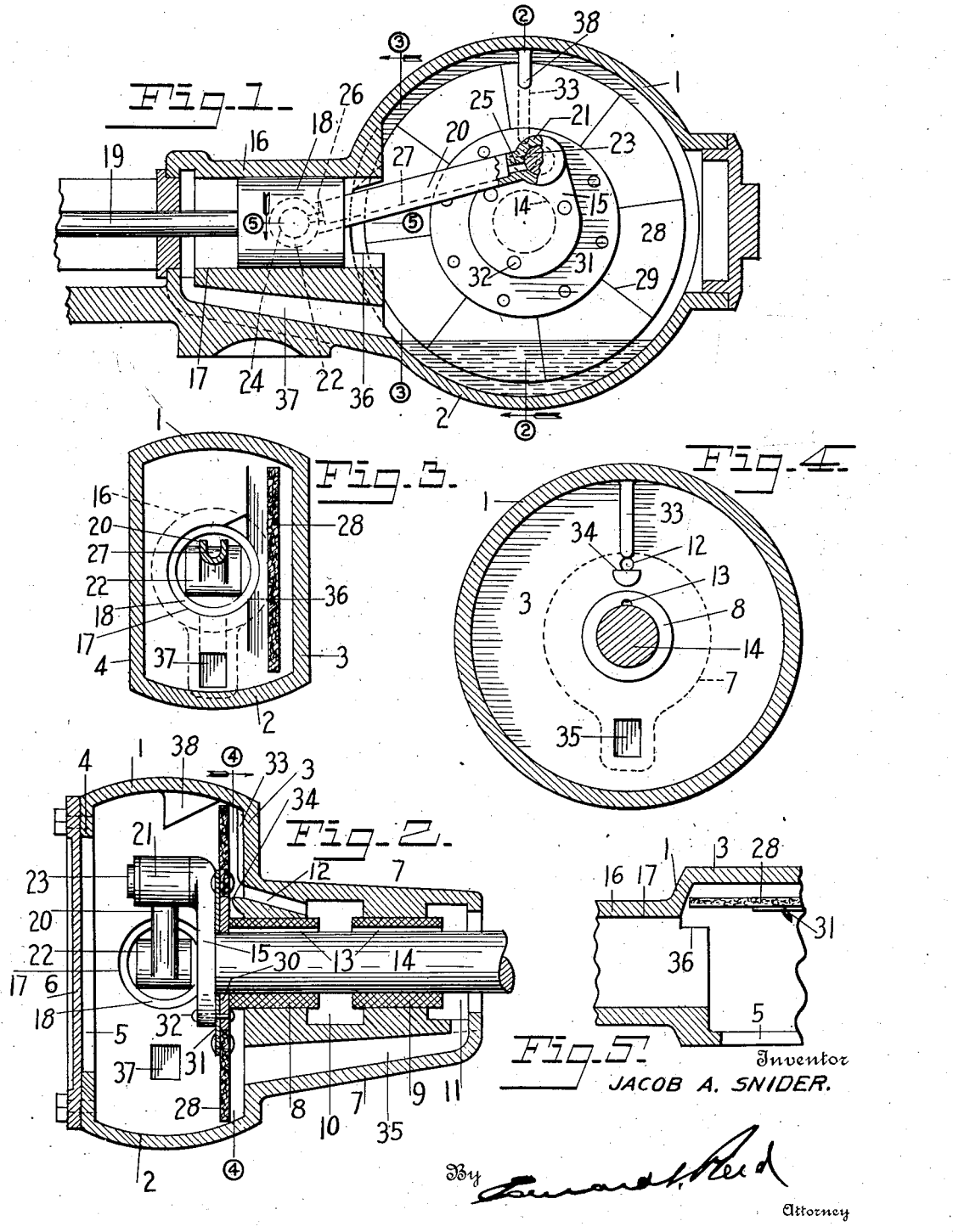
Inventor
JACOB A. SNIDER.

Patented Dec. 7, 1926.

1,609,582

UNITED STATES PATENT OFFICE.

JACOB A. SNIDER, OF DAYTON, OHIO, ASSIGNOR TO THE UNIFLOW PUMP & MANUFACTURING COMPANY, OF DAYTON, OHIO, A CORPORATION OF OHIO.

LUBRICATING DEVICE.

Application filed October 19, 1923. Serial No. 669,555.

This invention relates to a lubricating device and is designed more particularly for lubricating the operating mechanism of a pump or the like.

One object of the invention is to provide a device which will adequately and positively lubricate the moving parts of an operating mechanism of this kind.

A further object of the invention is to provide a lubricating device of the splash type which will maintain a constant flow of oil to the several bearings while the mechanism is in operation.

A further object of the invention is to provide a lubricating device of this kind which will be simple in its construction and operation; which will be of such a character that it will not be easily disarranged or rendered inoperative; and which can be produced at a low cost.

Other objects of the invention will appear as the device is described in detail.

In the accompanying drawings Fig. 1 is a sectional view taken lengthwise of one end of a pump showing my invention applied thereto; Fig. 2 is a section taken on the line 2—2 of Fig. 1; Fig. 3 is a section taken on the line 3—3 of Fig. 1; Fig. 4 is a section taken on the line 4—4 of Fig. 2; and Fig. 5 is a detail section taken on the line 5—5 of Fig. 1.

In these drawings I have illustrated one embodiment of my invention and have shown the same as applied to the operating mechanism of a pump of the type commonly used in connection with domestic water distributing systems but it will be understood that this particular embodiment has been chosen for the purposes of illustration only and that the invention may be applied to mechanisms of various kinds and that the construction and arrangement of the several parts may take various forms without departing from the spirit of the invention.

In that particular embodiment here illustrated the invention is applied to the operating mechanism of a pump which is enclosed within a housing 1 circular in outline and the lower portion of which forms an oil receptacle, as shown at 2. The end walls of this housing are preferably flat, as shown at 3 and 4. The front wall, 4, has an opening 5 therein which is closed by a suitable closure or plate 6 which is detachably secured to the front wall of the housing. The rear wall 3 of the housing is provided with a lateral extension or boss 7 having mounted therein bearings 8 and 9. The bearings are spaced apart and the interior of the boss is so shaped as to provide an oil chamber 10 between the two bearings and an oil chamber 11 at the outer end of the rear bearing. The wall 3 of the housing and the adjacent portion of the extension or boss 7 have formed therein an opening or conduit 12 which leads to the oil chamber 10 and consequently to the bearings. The bearings are provided with internal oil passageways 13 which permits the oil to enter the bearings and to pass from one oil chamber to the other. Journaled in the bearings 8 and 9 is a shaft 14 which may be driven from any suitable source of power, not shown, and the inner end of which projects into the housing 1 and has rigidly secured thereto a crank 15 which is arranged adjacent to but spaced a short distance from the rear wall 3 of the housing.

The housing 1 is also provided with a second extension 16 which, in the present instance, is arranged substantially radially of the housing and in which is formed a bearing or guideway 17 for a slidable member or cross head 18 which is connected with a part to be operated. In the present construction a rod 19 is connected with the cross head 18 and with the piston of the pumping mechanism, which is not here shown. The cross head 18 is connected with the crank 15 by means of a connecting rod 20 having at its ends bearings 21 and 22 adapted, respectively, to receive a wrist pin 23 on the crank 15 and a wrist pin 24 on the cross head 18. These bearings are provided with openings 25 and 26 leading to the bearing surfaces and preferably arranged adjacent to the ends of the connecting rod so that oil will flow from the connecting rod to the bearings. Preferably the connecting rod is provided with a channel 27 in the upper edge thereof and the openings 25 and 26 are arranged to communicate with the respective ends of this channel. If desired, the connecting rod may be U-shaped in cross section, as shown in Fig. 3.

Mounted within the housing and preferably connected with the shaft 14 is an oil lifting member which extends into the oil receptacle 2 at the bottom of the housing and is adapted to lift the oil therefrom and to distribute the same to the several bearings. This oil lifting member may take various forms but it is preferably in the form of a disk 28 rigidly connected with the shaft 14 and of such a diameter that it will extend into the oil receptacle and close to the bottom thereof. The disk may be of any suitable character and material but, in the present construction, it is formed of flexible material, such as leather, and is provided with a plurality of substantially radial slits 29. These slits are not essential to the operation of the device as the continuous smooth surface of the disk will lift the oil in a satisfactory manner but by slitting the disk I facilitate its insertion into the housing through the opening 5, which is of a diameter less than the diameter of the disk and, further, I increase the lifting capacity of the disk because the slits will serve to slightly roughen the surface of the disk and thereby cause larger quantities of oil to adhere thereto. It is not necessary that the slits should be of such a character so as to provide spaces between the adjacent portions of the disk but the edges of these portions may abut one against the other. The joints between the adjacent portions will be slightly rough due to the fact that the edges of the flexible material will not be in absolute alinement one with the other but one edge will project slightly beyond the other to form a narrow shoulder on the face of the disk. The disk may be constructed of one or more pieces of material and in the present construction it is made up of a plurality of sections which are of such size and shape that when fitted together they produce an annular structure. The inner ends of these sections contact with the circular plate or disk 30 mounted on the shaft 14 and these inner ends are rigidly connected, by rivets or otherwise, to a second plate or disk 31 also secured to the shaft 14 and of a diameter somewhat greater than the diameter of the plate 30. As here shown, the plates 30 and 31 are rigidly connected one to the other and to the hub of the crank arm 15 by means of rivets 32. It will be apparent, therefore, that as the shaft 14 rotates the disk 28 will move through the oil in the receptacle 22 and will lift portions of the oil from the receptacle and distribute the same to the several bearings. The action of the disk will serve to splash the oil on the bearings and into the conduits leading thereto but to secure a more positive delivery of oil to the bearings and to insure larger quantities of oil reaching the bearings I have provided means for directing the oil to the conduits leading to the bearings. The rear wall 3 of the housing is provided with a rib or abutment 33 which is arranged alongside of the disk 28 and, in the present instance, is arranged radially of the housing. The lower end of this rib or abutment terminates above the opening 12 leading to the bearings 8 and 9 and as the oil is thrown from the disk 28 against this abutment it will flow down the abutment and enter the opening 12, which in turn delivers it to the bearings. I also prefer to form a ledge or shoulder 34 on the wall 3 immediately below the opening 12 so as to check the flow of the oil and divert the same into the opening. In this manner relatively large quantities of oil will enter the opening 12 and will flood the bearings 8 and 9. The oil will pass from the oil chamber 10 to the oil chamber 11 and thence through a conduit 35 back to the oil receptacle 2. I have also provided a second abutment 36 which extends inwardly from the peripheral wall of the housing and is so shaped as to direct the oil onto the bearing of the crank arm 15 and onto the connecting rod. This abutment is also arranged adjacent to the revolving disk 28 so that the oil will be thrown against it from the disk. In the present instance, the abutment is substantially triangular in shape and its apex is arranged immediately above the path of the bearing 21 and connecting rod 20. Consequently the oil which is thrown against the abutment will flow to the apex thereof and thence downwardly into the channel on the connecting rod which will deliver it to the bearings at the opposite ends thereof. The oil will be thrown from the disk directly into the guideway 17, when the cross head is in its outer position, the inner end of the guideway being cut away, as shown at 36 in Fig. 5, if desired, and when the cross head is in its innermost position it will project slightly beyond the inner end of the guideway and the oil will be thrown directly onto the cross head. As a result the bearing is practically flooded and ample lubrication is provided at all times. The oil which works its way past the cross head to the outer end of the guideway will be returned to the oil receptacle through a conduit 37. It will be noted that the arrangement of the abutments 33 and 36 and of the guideway 17, with relation to the disk, is such that the oil will be delivered to the bearings in substantially the same quantity regardless of the direction in which the disk is rotated. So far as the abutments 33 and 36 are concerned it makes no difference in which direction the disk rotates. A greater quantity of oil will be thrown into the guideway 17 when the disk rotates in a counter clock wise direction and will be thrown into that guideway when the disk rotates in clock wise direction, but the quantity delivered to the guideway will, in either instance, be ample for all purposes. This is an important feature of the invention because the shaft 14 is sometimes rotated in different directions in different installations and if the lubricating device is operable when the shaft rotates in one direction only different lubricating devices will be required for the different installations.

The operation of the device will be readily understood from the foregoing description thereof and it will be apparent that I have provided a lubricating device which is very simple in its construction and operation; which comprises but a few parts; and that these are of such a character that they will not be easily broken or so disarranged as to impair the operation of the device. Further, the device can be produced at a low cost and quickly and easily installed. The rotating disk will lift the oil in such quantities that it will be delivered to the bearings in streams and a constant flow will be maintained, so long as the mechanism is in operation, thereby practically flooding the bearings and providing the most efficient lubrication.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent, is:

1. In a lubricating device, a housing having an oil receptacle, and an oil lifting disk of flexible material rotatably mounted within said housing.

2. In a lubricating device, a housing having an oil receptacle, and an oil lifting disk rotatably mounted in said housing and having laterally projecting portions to cause the oil to adhere thereto.

3. In a lubricating device, a housing having an oil receptacle, and an oil lifting disk rotatably mounted in said housing and provided with slits extending inwardly from the periphery thereof.

4. In a lubricating device, a housing having an oil receptacle, and an oil lifting disk of flexible material rotatably mounted in said housing and provided with a plurality of substantially radial slits.

5. In a lubricating device, a housing having an oil receptacle, and an oil lifting disk comprising a plurality of sections of flexible material, and rotatably mounted in said housing.

6. In a lubricating device, a housing having an oil receptacle, and an oil lifting disk formed of leather, and rotatably mounted in said housing.

7. In a lubricating device, a housing having an oil receptacle, and an oil lifting disk formed of leather, having its outer portion slit at intervals, and rotatably mounted in said housing.

8. In a lubricating device, a housing having an oil receptacle, a shaft journaled in said housing, a supporting plate rigidly secured to said shaft, and a disk of flexible material secured to said supporting plate.

9. In a lubricating device, a housing having an oil receptacle, a shaft journaled in said housing, a supporting structure rigidly secured to said shaft within said housing, and a plurality of sections of flexible material rigidly secured at their inner edges to said supporting structure and arranged to form a disk-like structure.

In testimony whereof, I affix my signature hereto.

JACOB A. SNIDER.